United States Patent
Yagi et al.

(10) Patent No.: US 6,815,003 B2
(45) Date of Patent: Nov. 9, 2004

(54) METHOD FOR FABRICATING ELECTRODE FOR LITHIUM SECONDARY BATTERY

(75) Inventors: Hiromasa Yagi, Nishinomiya (JP); Koji Endo, Katano (JP); Hisaki Tarui, Shijyonawate (JP); Hiroshi Okano, Takamatsu (JP); Shingo Nakano, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/995,863

(22) Filed: Nov. 29, 2001

(65) Prior Publication Data
US 2002/0102348 A1 Aug. 1, 2002

(30) Foreign Application Priority Data

Dec. 1, 2000 (JP) .................................. 2000-366876
Jan. 17, 2001 (JP) .................................. 2001-008692

(51) Int. Cl.[7] ............................ B05D 5/12; H01M 6/00; C23C 14/32
(52) U.S. Cl. ................. 427/115; 427/126.1; 427/307; 427/327; 427/255.28; 427/255.35; 427/255.393; 427/452; 29/623.1; 29/623.5; 204/192.15; 204/192.17
(58) Field of Search ................. 204/192.15, 192.17; 427/255.28, 255.35, 255.393, 452, 115, 126.1, 307, 327; 429/231.9, 231.95; 29/623.1, 623.5

(56) References Cited

U.S. PATENT DOCUMENTS

| 5,162,178 | A | * | 11/1992 | Ohsawa et al. ............. 429/213 |
| 5,542,163 | A | * | 8/1996 | Chang .............................. 29/2 |
| 5,900,336 | A | * | 5/1999 | Kabata et al. ........... 429/231.4 |
| 6,063,142 | A | | 5/2000 | Kawakami et al. ........ 29/623.5 |
| 6,117,589 | A | * | 9/2000 | Satou et al. ................. 429/211 |
| 6,195,251 | B1 | * | 2/2001 | Suhara et al. ................ 361/502 |

FOREIGN PATENT DOCUMENTS

| JP | 11-86875 A | 3/1999 |
| JP | 2000-012088 A | 1/2000 |
| JP | 2000-149928 A | 5/2000 |
| JP | 2000-282265 A | 10/2000 |
| JP | 2001-040490 A | 2/2001 |

* cited by examiner

*Primary Examiner*—Brian K. Talbot
(74) *Attorney, Agent, or Firm*—Kubovcik & Kubovcik (57) ABSTRACT

A method for fabricating an electrode for lithium secondary battery formed by depositing a thin film composed of active material capable of lithium storage and release, on a metallic foil to be used as a current collector, in which the surface of the metallic foil is roughened through wet-etching and then the thin film is deposited on the roughened surface.

11 Claims, 5 Drawing Sheets

METHOD FOR FABRICATING ELECTRODE FOR LITHIUM SECONDARY BATTERY

BACKGROUND OF THE INVENTION

1. Field of the Invention

The present invention relates to a method for fabricating a novel electrode for lithium secondary battery.

2. Related Art

In a lithium secondary battery having been actively researched and developed recently, battery characteristics such as charge/discharge voltages, charge/discharge cycle life characteristics and storage characteristic are greatly influenced by an electrode used. Therefore, battery characteristics are enhanced by improving an active material used for an electrode.

Although it is possible to constitute a battery having high energy densities per weight and volume by using lithium metal as a negative active material, a problem occurs that lithium is deposited like dendrite to cause an internal short-circuiting.

On the other hand, a lithium secondary battery is reported which uses any one of aluminum, silicon and tin which are electrochemically alloyed with lithium during charge (Solid State Ionics, 113–115, p.57(1998)). Among the above materials, silicon is particularly prospective as negative electrode for a battery with a high capacity, having a large theoretical capacity. For this reason, various secondary batteries respectively using silicon for the negative electrode are proposed (Japanese Patent Laid Open No. Hei 10-255768). In the case of the negative alloy electrode of this type, however, a sufficient cycle characteristic is not obtained because the alloy itself, which is an active material, is pulverized due to charge/discharge and thereby, the current-collecting characteristic is deteriorated.

In order to overcome these problems, proposed is an electrode for lithium secondary battery obtained by forming a microcrystalline silicon thin film or an amorphous silicon thin film on a current collector by a thin-film forming method such as CVD method or sputtering method, which electrode shows good charge/discharge cycle characteristics (International Patent Laid Open WO01/31720A1 etc.).

SUMMARY OF THE INVENTION

It is an object of the present invention to provide a method for fabricating an electrode for lithium secondary battery using an active thin film such as a silicon thin film, having high charge/discharge capacities, and being superior in charge/discharge cycle characteristic.

The first aspect of the present invention is a method for fabricating a electrode for lithium secondary battery to be formed by depositing an active thin film capable of lithium storage and release, on a metallic foil used as a current collector, in which the surface of the metallic foil is roughened by wet-etching, and the active thin film is deposited on the roughened surface.

The second aspect of the present invention is a method for fabricating an electrode for lithium secondary battery to be formed by depositing an active thin film capable of lithium storage and release, on a metallic foil used as a current collector, in which the surface of the metallic foil is roughened by spraying particles, so called "sand blasting", to make collision with the surface of the metallic foil, and the active thin film is deposited on the roughened surface.

An active thin film of the present invention is formed by depositing the film on a metallic foil. A method for supplying a material from a gaseous phase and depositing an active thin film is preferably used as a method for forming the active thin film. This type of method includes sputtering, CVD, vacuum evaporation, and thermal spraying processes. Moreover, a method for forming an active thin film from a liquid phase includes electrolytic plating and electroless plating processes.

An active thin film of the present invention is a thin film made of an active material for storing and releasing lithium. As an active thin film, an active thin film which stores lithium by being alloyed with lithium is preferably used. As a material for the above active thin film, silicon, germanium, tin, lead, zinc, magnesium, sodium, aluminum, gallium, and indium and the like are exemplified.

An active material in which silicon or germanium is main component is preferable from the viewpoint that it is easy to form a thin film through the thin-film forming method from gaseous phase. Moreover, an active material in which silicon is main component is particularly preferable from the viewpoint of high charge/discharge capacities.

Moreover, it is preferable that an active thin film is an amorphous thin film or a microcrystalline thin film. Therefore, an amorphous silicon thin film or a microcrystalline silicon thin film is preferably used as an active thin film. The amorphous silicon thin film is a thin film in which a peak around 520 $cm^{-1}$ corresponding to a crystal region is not substantially detected through the Raman spectroscopic analysis, and the microcrystalline silicon thin film is a thin film in which both a peak around 520 $cm^{-1}$ corresponding to a microcrystalline region and a peak around 480 $cm^{-1}$ corresponding to an amorphous region are substantially detected through the Raman spectroscopic analysis. Further, it is preferable to use an amorphous germanium thin film, a microcrystalline germanium thin film, an amorphous silicon-germanium alloy thin film, and a microcrystalline silicon-germanium alloy thin film.

A metallic foil used as a current collector in the present invention is not restricted as far as the foil can be used as a current collector of an electrode for lithium secondary battery. However, it is preferable that the metallic foil is made of a metal not to be alloyed with lithium. As such a metallic foil, for example, metallic foils made of copper, iron, nickel, tantalum, molybdenum or tungsten, or an alloy containing at least one of these metals are used.

In the first aspect of the present invention, the surface of a metallic foil is roughened by wet-etching and then an active thin film is deposited on the roughened surface. By wet-etching the surface of the metallic foil, the surface roughness Ra of the metallic foil surface is preferably set to 100 nm (0.1 μm) or more, further preferably set to 150 nm (0.15 μm) or more, or still further preferably set to 200 nm (0.2 μm) or more. The surface roughness Ra is specified in Japanese Industrial Standards (JIS B 0601-1994) and it can be measured by a surface roughness meter or a scanning probe microscope (SPM).

An etchant used for wet-etching is not restricted as far as can etch the surface of an objective metallic foil. As such an etchant, a hydrochloric acid based etchant may be used.

In the second aspect of the present invention, the surface of a metallic foil is roughened by spraying particles on the surface of the metallic foil to collide the particles with the surface. As a particle to be sprayed on the surface of the metallic foil, generally used is a particle made of a material harder than the metallic foil. As such a particle, a particle made of alumina, silicon carbide, glass, steel, stainless steel, zinc, or copper is used.

It is possible to control the degree of roughening of the surface of a metallic foil in accordance with the type, size, quantity, and spraying pressure of particles to be sprayed on the surface. Moreover, in general, particles are made to collide with the surface of a metallic foil by feeding a metallic foil so as to pass through an area to which particles are sprayed. It is possible to control the degree of roughening also by the feed rate of the metallic foil.

It is possible to use a particle having a size at a grade of #200 to #2,000, that is, having a maximum particle diameter of 10 to 150 μm as a size of a particle.

In the second aspect of the present invention, it is preferable that the surface of a metallic foil is roughened so that the surface roughness Ra becomes 0.1 μm or more. More preferably, it is roughened so that the surface roughness Ra becomes 0.15 μm or more and still further preferably, it becomes 0.2 μm or more. The surface roughness Ra is specified in Japanese Industrial Standards (JIS B 0601-1994) and it can be measured by a surface roughness meter or a scanning probe microscope (SPM).

Because a surface oxide film may be formed on the surface of a metallic foil, it may be preferable to remove the surface oxide film before depositing an active thin film. In the second aspect of the present invention, because the surface of a metallic foil is roughened by making particles collide with the surface, it is possible to remove a surface oxide film from the surface of the metallic foil when roughening. Moreover, when the surface of a metallic foil is rustproofed and thereby, a rustproofing layer is present on the surface, it is possible to remove the rustproofing layer when roughening.

In the present invention, an interlayer may be provided on the roughened surface of a metallic foil and an active thin film may be provided on the interlayer. We have found that the diffusion of the current collector component in the active thin film to form a solid solution improves the adhesion between the current collector and the active thin film as well as the charge/discharge cycle characteristic. From this viewpoint, when a metallic foil does not contain a component diffusing in an active thin film, it is preferable to provide an interlayer containing a component which diffuses in an active thin film to form a solid solution. When a silicon thin film is used as an active thin film, and a nickel foil is used as a metallic foil, it is preferable to provide an interlayer made of a copper layer on a nickel foil and provide a silicon thin film on the interlayer, because nickel (Ni) does not easily form a solid solution with silicon (Si). Copper (Cu) is a component that diffuses in a silicon thin film and easily forms a solid solution.

According to the present invention, an active thin film is formed by depositing the film on the surface of a metallic foil roughened through wet-etching or collision with particles. Because the surface of the metallic foil is roughened, the contact area between the active thin film and the surface of the metallic foil increases, thereby to improve the adhesion of the active thin film to the metallic foil. Therefore, even if the active thin film is expanded and shrinked due to a charge/discharge reaction, the active thin film is prevented from delaminating from the current collector by the stress.

Moreover, we have found that when forming an active thin film on the surface of a roughened metallic foil, irregularities corresponding to irregularities on the surface of the metallic foil are formed on the surface of the active thin film. Furthermore, we have found that in an active thin film with irregularities on its surface, gaps are formed in a manner to extend in its thickness direction from valleys of the irregularities of the thin film surface when the thin film is expanded and shrinked due to a charge/discharge reaction, and that these gaps serve to lessen a stress engendered due to expansion and shrinkage of the thin film on charge and discharge. As a result, an excellent charge/discharge cycle characteristic is obtained.

Furthermore, according to the second aspect of the present invention, the surface of a metallic foil is roughened by spraying particles to collide the particles with the surface. Therefore, it is possible to control at will the degree of roughening the surface of a metallic foil by adjusting the type, size, quantity, or spraying pressure of the particles. Furthermore, according to the second aspect of the present invention, various materials can be used for a metallic foil. Furthermore, because a roughening step is a drying step, it is possible to roughen the surface of a metallic foil without complicating the fabrication process.

DESCRIPTION OF THE PREFERRED EMBODIMENTS

The present invention will be described in more detail below based on embodiments. However, the present invention is not restricted to the embodiments. Various modifications of the present invention are allowed as far as the modifications are not deviated from the scope of the present invention.

EXPERIMENT 1

[Wet Etching]

The surface of a rolled nickel foil (thickness of 15 μm) was wet-etched. It was etched by using an Ni etchant for a thick film (hydrochloric acid based etchant made by MEC Co., Ltd.) so as to immerse the foil in the etchant for 2 minutes at a treatment temperature of 25° C. The etching depth was set to approxmately 0.6 μm for either side. Thereafter, the foil was washed by water and drained and then, immersed in 7% hydrochloric acid aqueous solution for 30 sec at 25° C. Then, the foil was washed by water and then dried.

[Measurement of surface roughness of current collector]

A wet-etched rolled nickel foil, a rolled nickel foil not wet-etched, and a commercial electrodeposited nickel foil (thickness of 20 μm) were used as current collectors.

The surface of each of the above metallic foils was observed by a scanning probe microscope (SPM).

Figure 1:
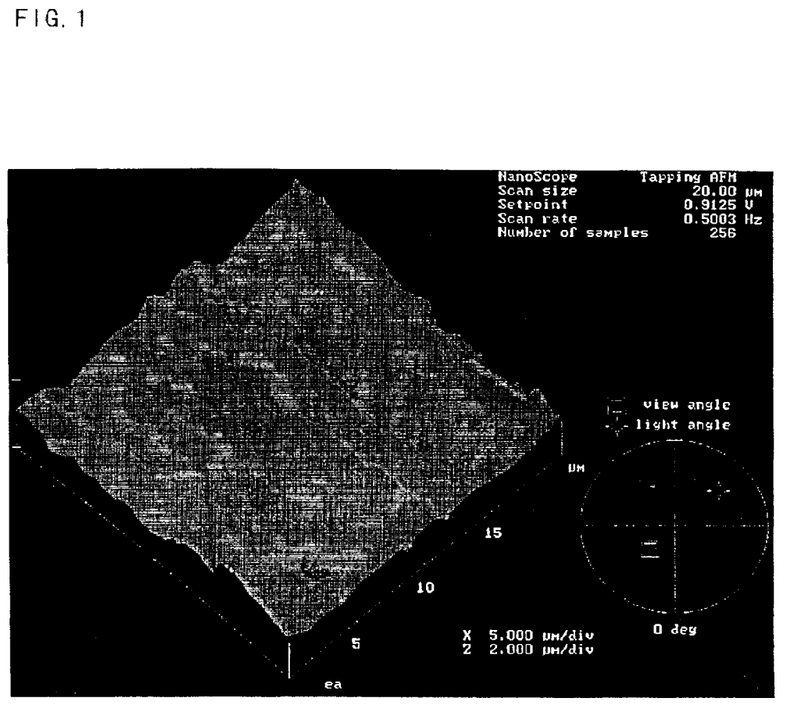
FIG. 1 is an SPM image of the surface of a wet-etched rolled nickel foil.
Figure 2:
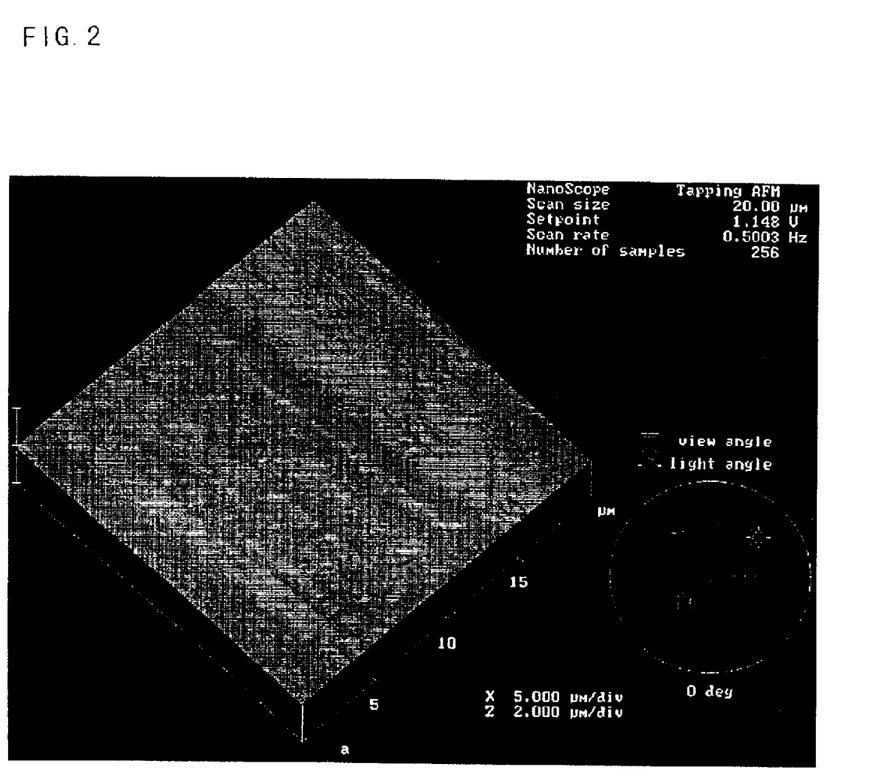
FIG. 2 is an SPM image of the surface of a rolled nickel foil not wet-etched.
Figure 3:
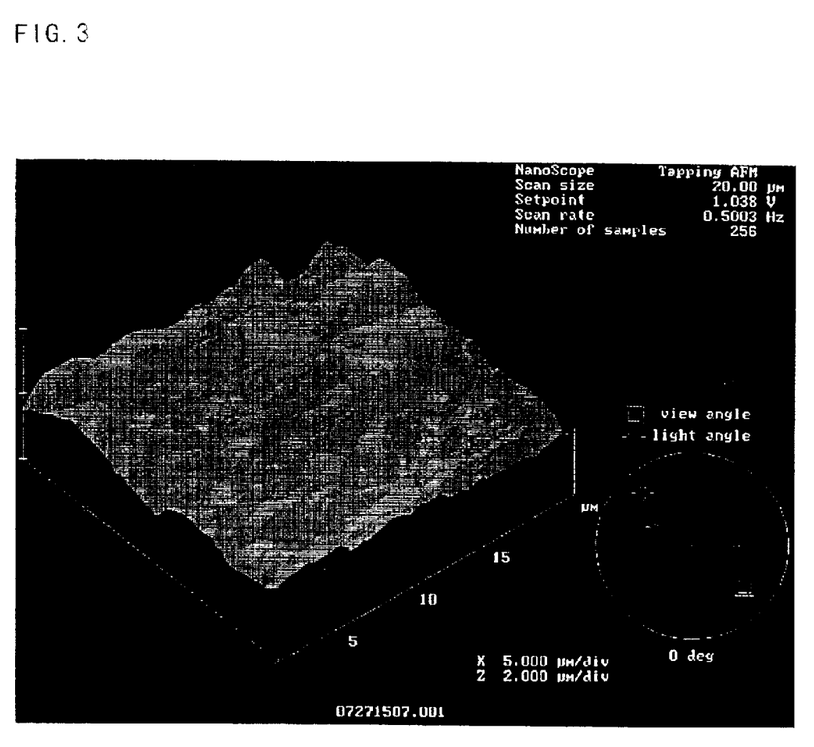
FIG. 3 is an SPM image of the surface of an electrodeposited nickel foil.

FIG. 1 is an SPM image showing a surface of the wet-etched rolled nickel foil. FIG. 2 is an SPM image showing a surface of the rolled nickel foil not wet-etched. FIG. 3 is an SPM image showing a surface of the electrodeposited nickel foil.

From a comparison between FIGS. 1 and 2, it is found that irregularities are formed on the surface of the rolled nickel foil by wet-etching the foil. As seen from FIG. 3, it is found that irregularities are also formed on the surface of the electrodeposited nickel foil similarly to that of the wet-etched rolled nickel foil.

As a result of measuring surface roughnesses Ra by using an SPM, it was found that the roughness Ra of the wet-etched rolled nickel foil shown in FIG. 1 was 200 nm (0.2 μm), that of the surface of the rolled nickel foil not wet-etched shown in FIG. 2 was 30 nm (0.03 μm), and that of the surface of the electrodeposited nickel foil shown in FIG. 3 was 200 nm (0.2 μm).

[Formation of Copper Layer]

A copper layer was formed on each current collector as an interlayer and then, a silicon thin film was formed on the layer.

The copper layer was formed by the sputtering method. As conditions of forming the copper layer, the input power was set to 200 W, the argon (Ar) gas flow rate was set to 60 sccm, and the pressure for forming a thin film was set to 0.1 Pa. A target having a diameter of 2 inches was used and the power density was set to 15 W/cm$^2$. The initial pressure in a chamber was reduced so that it became $1\times10^{-4}$ Pa or lower to form at a rate of 20 nm/min. The thickness of a copper layer was aproximately 0.5 μm.

[Formation of Silicon Thin Film]

A silicon thin film was formed on a copper layer by the sputtering method. As conditions of forming the thin film, the input power was set to 350 W, the argon (Ar) gas flow rate was set to 100 sccm, and the pressure in a chamber when forming the thin film was set to 0.1 Pa. A target having a diameter of 4 inches was used and the power density was set to 4.3 W/cm$^2$. Moreover, a chamber was exhausted so that the initial pressure in the chamber became $1\times10^{-4}$ Pa or lower. An amorphous silicon thin film having a thickness of approximately 5 μm was formed at a film forming rate of 45 nm/min.

As a result of observing the state after forming silicon thin films, a silicon thin film on a rolled nickel foil not wet-etched was peeled from the foil. On the contrary, a silicon thin film on a wet-etched rolled nickel foil and a silicon thin film on an electrodeposited nickel foil were preferably brought into close contact with the metallic foils. Therefore, charge/discharge characteristics were evaluated for an electrode using the wet-etched rolled nickel foil and an electrode using the electrodeposited nickel foil as described below.

[Evaluation of Charge/Discharge Characteristics of Single Electrode Cell]

Figure 4:
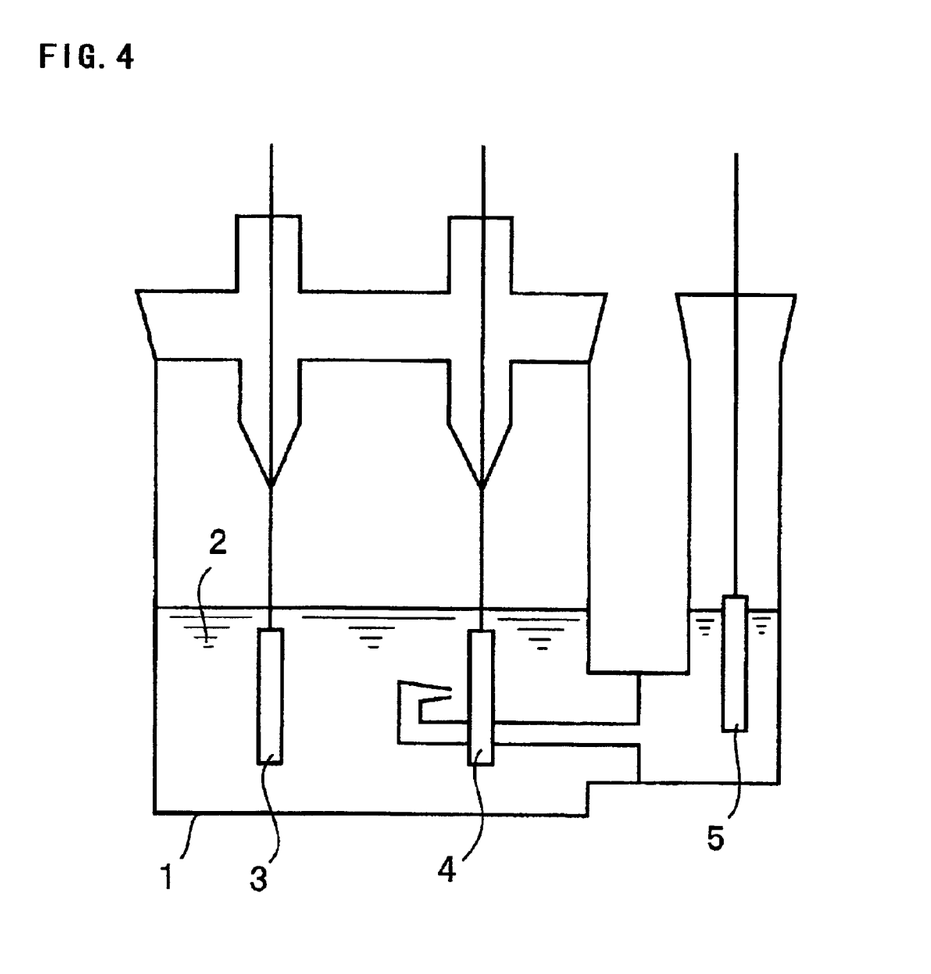
FIG. 4 is a schematic view showing a single electrode cell fabricated for an embodiment of the present invention.

The beaker cell shown in FIG. 4 was fabricated by using the above electrodes as work electrodes. As shown in FIG. 4, the beaker cell is constituted by immersing a counter electrode 3, a work electrode 4, and a reference electrode 5 in an electrolyte poured in a vessel 1. The electrolyte was prepared by dissolving LiPF$_6$ in a mixed solvent in which ethylene carbonate was mixed with diethyl carbonate at a volume ratio of 1:1. Lithium metal was used as the counter electrode 3 and reference electrode 5.

A capacity retention rate defined by the following formula was obtained by charging the fabricated beaker cell at 25° C. and a constant current of 1 mA up to 0 V (vs.Li/Li$^+$) and then, discharging the cell at a constant current up to 2 V (vs.Li/Li$^+$), and then performing charge/discharge up to 10 cycles by serving the above charge/discharge cycle as one cycle. The results are shown in Table 1. In this case, reduction of the work electrode is assumed as charge and oxidation of the work electrode is assumed as discharge.

Capacity retention rate (%)=(Discharge capacity at 10th cycle/discharge capacity at 1st cycle)×100

TABLE 1

| | Capacity Retention Rate (%) |
|---|---|
| Wet-Etched Rolled-Nickel Foil | 100 |
| Electrodeposited Nickel Foil | 98 |

As apparent from the results shown in Table 1, the electrode using the rolled nickel foil wet-etched as a current collector in accordance with the present invention shows a charge/discharge cycle characteristic same as or more excellent than that using the electrodeposited nickel foil.

[Evaluation of Charge/Discharge Characteristics of Lithium Secondary Battery]

A lithium secondary battery was fabricated by employing the above electrode using the wet-etched rolled nickel foil as a negative electrode.

A positive electrode was fabricated as described below. A mixed slurry for positive electrode was prepared by adding 90 parts by weight of LiCoO$_2$ powder and 5 parts by weight of artificial graphite powder serving as a conductive material to 5% by weight of N-methylpyrrolidone aqueous solution containing 5 parts by weight of polytetrafluoroethylene serving as a binder. A positive active material was formed by applying the slurry onto an aluminum foil (thickness of 18 μm) serving as a positive current collector by the doctor blade method and then drying the slurry. A positive electrode was finished by setting a positive electrode tab on the area of the aluminum foil to which the positive active material was not applied.

A negative electrode was finished by setting a negative electrode tab onto the area in which no silicon thin film is formed.

Figure 5:
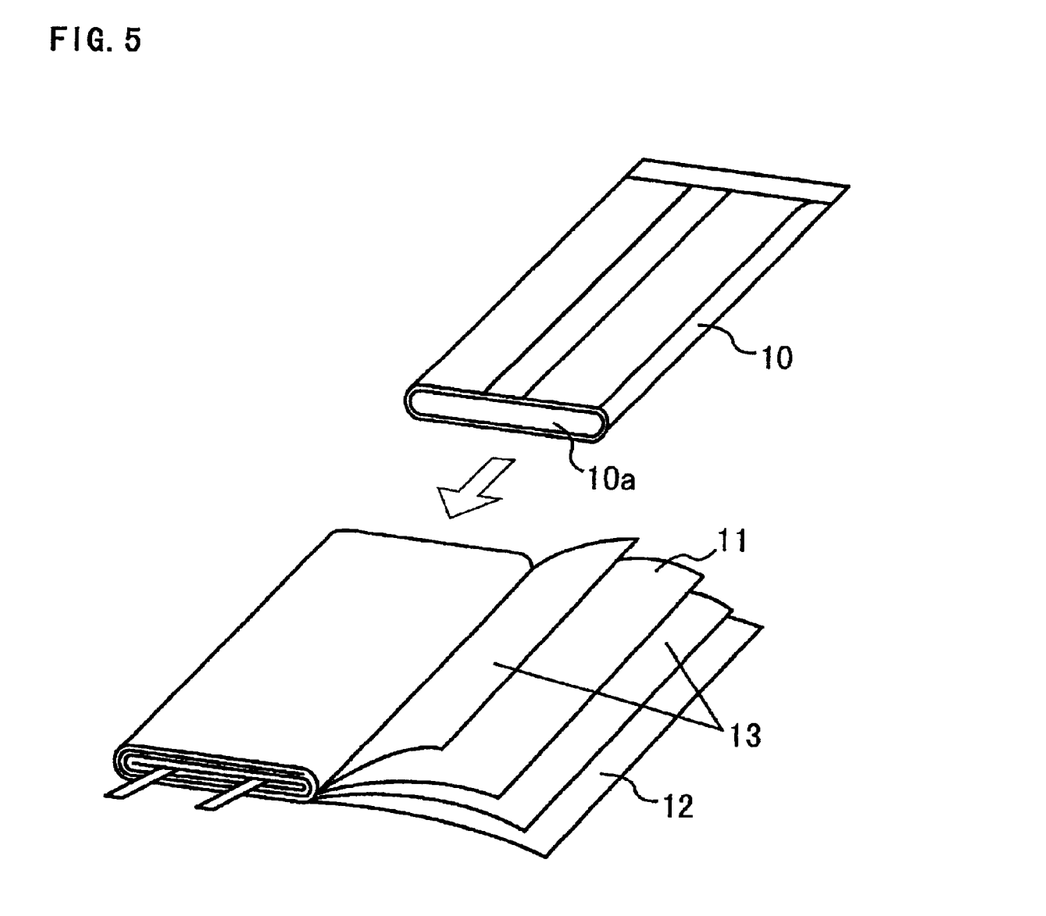
FIG. 5 is an exploded perspective view showing a secondary lithium battery fabricated for an embodiment of the present invention.

The lithium secondary battery shown in FIG. 5 was fabricated by using the positive and negative electrodes obtained as described above.

As shown in FIG. 5, a separator 13 was placed between a positive electrode 11 and a negative electrode 12 and further, another separator 13 was placed on the positive electrode 11 and they were wound and pressed to be flat and then, inserted into a casing 10. Then, an electrolyte same as that of the above beaker cell was injected into the casing 10 and the opening 10a of the casing 10 was closed to finish a lithium secondary battery.

A negative electrode using natural graphite as an active material was fabricated for comparison. Specifically, 5% by weight of N-methylpyrrolidone aqueous solution containing 95 parts by weight of natural graphite powder and 5 parts by weight of polytetrafluoroethylene serving as a binder was prepared so as to be used as mixed slurry for negative electrode and the slurry was applied onto a current collector obtained by forming a copper layer on a rolled nickel foil not wet-etched and dried so as to be used as a negative electrode. The lithium secondary battery shown in FIG. 5 was fabricated similarly to the above-mentioned process except for using this negative electrode.

A charge/discharge cycle test was performed to each of the lithium secondary batteries fabricated as described above. Each lithium secondary battery was charged up to 4.2 V at 1 mA/cm$^2$ and then discharged up to 2.75 V at 1 mA/cm$^2$ to continue charge/discharge up to 10 cycles by assuming the above charge and discharge as one cycle. Table 2 shows the discharge capacity at 10th cycle, the average discharge voltage up to 10th cycle, and volume energy densities and weight energy densities of the lithium secondary batteries.

TABLE 2

|  | Discharge Capacity (mAh) | Average Discharge Voltage (V) | Volume Energy Density (Wh/l) | Weight Energy Density (Wh/kg) |
|---|---|---|---|---|
| Inventive Example (Wet-Etched Rolled-Nickel Foil) | 765 | 3.5 | 368 | 207 |
| Comparative Example (Carbon Negative Electrode) | 476 | 3.8 | 247 | 152 |

As shown in Table 2, an electrode for a lithium secondary battery fabricated in accordance with the first aspect of the present invention has a high discharge capacity compared to a conventional electrode using carbon as an active material, and therefore provides a lithium secondary battery having high volume and high weight energy densities.

EXPERIMENT 2

[Roughing by Spraying Particles]

A rolled stainless steel foil (surface roughness Ra=0.025 µm) was attached and fixed to a stainless plate, and blasting was performed by spraying particles to the surface of the stainless steel foil to collide the particles with the surface. Particles made of alumina of #320 (maximum particle diameter of 80 µm) were used as those to be collided with the surface. The particle spraying quantity was set to 320 g/min and the particle spraying pressure was set to 0.25 MPa. Blasting was performed by spraying particles while reciprocating a nozzle for spraying particles in the transverse direction and feeding a stainless foil in the vertical direction to make the foil pass through the spraying area. The rate of moving the nozzle was set to 50 mm/sec and the rate of moving the stainless steel foil was set to 0.6 mm/sec.

The surface roughness Ra of the rolled stainless steel foil whose surface was roughened by blasting was 0.32 µm.

[Formation of Silicon Thin Film]

An amorphous silicon thin film was formed by the RF sputtering method on the surface of the rolled stainless steel foil roughened as described above. An amorphous silicon thin film having a thickness of 6 µm was formed by using single crystal silicon (P-type, 1 Ωcm or less) as a target, setting into a vacuum chamber with a stainless steel foil attached and fixed to a stainless steel plate, evacuating the inside of the vacuum chamber up to $1 \times 10^{-3}$ Pa or lower, introducing argon gas from an introduction port until the pressure becomes 0.5 Pa, and sputtering the foil at a RF power density of 3 W/cm$^2$ and a distance between target-substrate of 10 cm.

[Fabrication of Negative Electrode]

A negative electrode was fabricated by using a stainless steel foil on which a silicon thin film was formed as described above and setting a negative electrode tab onto a stainless steel foil on which a silicon thin film was not formed.

[Fabrication of Positive Electrode]

A mixed slurry for positive electrode was prepared by adding 90 parts by weight of LiCoO$_2$ powder and 5 parts by weight of artificial graphite powder serving as a conductive material to 5% by weight of N-methylpyrrolidone aqueous solution containing 5 parts by weight of polyvinylidene fluoride serving as a binder. The slurry was applied onto an aluminum foil (thickness of 20 µm) serving as a positive current collector by the doctor blade method and then dried to form a positive active material layer. A positive electrode was finished by setting a positive electrode tab on an area of the aluminum foil to which no positive active material was applied.

[Fabrication of Battery]

The lithium secondary battery (example 2) shown in FIG. 5 was fabricated by using the positive and negative electrodes fabricated as described above.

As shown in FIG. 1, the separator 13 was placed between the positive electrode 11 and the negative electrode 12 and further another separator 13 was placed onto the positive electrode 11, and then they were wound and pressed to be flat and inserted into the casing 10. Then, electrolyte was injected into the casing 10 and the opening 10a of the casing 10 was closed to finish a lithium secondary battery. The electrolyte was prepared by dissolving 1 mol/l of LiPF$_6$ in a mixed solvent in which ethylene carbonate was mixed with diethyl carbonate at a volume ratio of 1:1.

COMPARATIVE EXAMPLE 2

A negative electrode was fabricated similarly to the case of the above example except for forming a silicon thin film on a not-blasted, i.e. not-roughened rolled stainless steel foil as a current collector. A lithium secondary battery was fabricated by using the negative electrode similarly to the above-mentioned process. The surface roughness Ra of the rolled stainless steel foil was 0.025 µm.

(Evaluation of Initial Discharge Capacity of the Battery)

The initial discharge capacity was measured for each lithium secondary battery fabricated as described above. Each lithium secondary battery was charged up to 4.2 V at a constant current of 140 mA and then discharged up to 2.75 V at a constant current of 140 mA and then the above charge/discharge was assumed as initial charge/discharge. Initial discharge capacities of the lithium secondary batteries are shown in Table 3.

TABLE 3

|  | Initial Discharge Capacity |
|---|---|
| Example 2 | 699 mAh |
| Comparative Example 2 | Could not be measured because of peeling of thin film |

As shown in Table 3, in the case of the battery of the comparative example 2, the discharge capacity could not be measured because a thin film was peeled. In the case of the example 2, however, a high discharge capacity is obtained.

From the above results, it is found that the adhesion between a metallic foil serving as a current collector and an active thin film can be improved by roughening the surface of the metallic foil via blasting and then depositing the active thin film on the roughened surface.

According to the present invention, it is possible to fabricate a lithium secondary battery having a large discharge capacity and superior in charge/discharge cycle characteristic.

What is claimed is:

1. A method for fabricating an electrode for lithium secondary battery, comprising the steps of:

roughening a surface of a metallic foil through wet-etching; and depositing a thin film by sputtering, CVD, vacuum evaporation, thermal spraying, electric plating or electroless plating on the roughened surface of the metallic foil, which is a current collector, so as to form irregularities on the surface of the thin film corresponding to irregularities on the roughened surface of the metallic foil, the thin film being any one of an amorphous silicon thin film, a microcrystalline silicon thin film, an amorphous germanium thin film, a microcrystalline germanium thin film, an amorphous silicon-germanium alloy thin film, and a microcrystalline silicon-germanium alloy thin film; and forming gaps in the thin film in a manner to extend in its thickness direction from valleys of the irregularities of the thin film surface when the thin film is expanded and shrunk due to a charge/discharge reaction.

2. The method for fabricating the electrode for lithium secondary battery according to claim 1, wherein surface roughness Ra of said surface of the metallic foil is made to be 100 nm or more through said wet-etching.

3. The method for fabricating the electrode for lithium secondary battery according to claim 1, wherein said wet-etching is the etching using a hydrochloric acid based etchant.

4. The method for fabricating the electrode for lithium secondary battery according to claim 1, wherein said metallic foil is a nickel foil.

5. The method for fabricating the electrode for lithium secondary battery according to claim 4, wherein said nickel foil is a rolled nickel foil.

6. The method for fabricating the electrode for lithium secondary battery according to claim 1, further comprising the step of forming an interlayer on the roughened surface of said metallic foil prior to depositing the thin film.

7. The method for fabricating the electrode for lithium secondary battery according to claim 6, wherein said interlayer contains a component to be diffused into said thin film.

8. The method for fabricating the electrode for lithium secondary battery according to claim 6, wherein said interlayer is a copper layer.

9. A method for fabricating an electrode for lithium secondary battery, comprising the steps of:

roughening a surface of a metallic foil to be used as a current collector by spraying particles on the surface of the metallic foil to collide the particles with the surface; and depositing a thin film by sputtering, CVD, vacuum evaporation, thermal spraying, electric plating or electroless plating on the roughened surface of the metallic foil, which is a current collector, so as to form irregularities on the surface of the thin film corresponding to irregularities on the roughened surface of the metallic foil, the thin film being any one of an amorphous silicon thin film, a microcrystalline silicon thin film, an amorphous germanium thin film, a microcrystalline germanium thin film, an amorphous silicon-germanium alloy thin film, and a microcrystalline silicon-germanium ahoy thin film; and forming gaps in the thin film in a manner to extend in its thickness direction from valleys of the irregularities of the thin film surface when the thin film is expanded and shrunk due to a change/discharge reaction.

10. The method for fabricating the electrode for lithium secondary battery according to claim 9, wherein said metallic foil is made of copper, iron, nickel, tantalum, molybdenum, or tungsten, or an alloy containing at least one of these metals.

11. The method for fabricating the electrode for lithium secondary battery according to claim 9, wherein the maximum diameter of said particles is between 10 $\mu$m and 150 $\mu$m.

* * * * *